2,987,493
EMULSION POLYMERIZATION USING COPOLYMER OF A SALT OF METHACRYLIC ACID AND VINYL ACETATE

Dennis Grady and Arthur Hodge, Spondon, near Derby, England, assignors to British Celanese Limited, a company incorporated of Great Britain
No Drawing. Filed July 1, 1957, Ser. No. 668,896
Claims priority, application Great Britain July 4, 1956
5 Claims. (Cl. 260—29.6)

This invention relates to polymers and, in particular, to polymers useful as protective colloids in the polymerization of vinyl compounds.

In U.S. application Serial No. 668,910, we have described inter alia the polymerization of vinyl acetate in an aqueous medium containing as protective colloid a copolymer of a water-soluble unsaturated carboxylic acid such as methacrylic acid and an unsaturated ester, the ester being present in minor molar proportions, e.g. 0.5 to 20 molar percent. (In that specification, as herein, the term "copolymer" is not intended to imply that the substance in question is necessarily formed by copolymerizing its monomers. The term is intended to cover broadly polymeric substances containing the groups characteristic of the two components specified.) The copolymer may be made by direct copolymerization of the salt with the unsaturated ester or by copolymerizing the ester with the free unsaturated acid and reacting upon the acid copolymer so formed with a suitable base to form the saline copolymer required. The copolymer stated to be preferred in the application referred to is a copolymer of 95 to 99.5 moles of sodium methacrylate or other water-soluble methacrylate with 5 to 0.5 moles of methyl methacrylate.

While the copolymer referred to above, when used as described, enables stable emulsions of small particle size to be obtained, we have now found that even better results can be obtained by employing, as the protective colloid in such an emulsion polymerization process, a copolymer of a water-soluble salt of methacrylic acid with a minor proportion of vinyl acetate. The copolymer preferably contains 0.5 to 10% and especially 1 to 10% by weight of vinyl acetate. Unless otherwise stated all parts and percentages in this specification are by weight. We have obtained very useful results both with copolymers containing between 1 and 5%, e.g. 2 to 4% of vinyl acetate, and with copolymers containing 5 to 10% of vinyl acetate. The water-soluble salt is preferably a sodium salt though other water-soluble salts of methacrylic acid, e.g. potassium and ammonium salts, can be employed. The copolymer may be made by direct copolymerization of vinyl acetate with the water-soluble salt in an aqueous medium, or in a non-aqueous inert medium such as benzene or toluene, or by copolymerization of the vinyl acetate with the free acid, in an aqueous or non-aqueous medium, followed by reaction of the resulting acid copolymer to form the desired saline copolymer.

For economic reasons it is, of course, advantageous to reduce to a minimum the number of separate operations in making the protective colloid. We have found that a satisfactory product can be made from methacrylic acid, alkali metal hydroxide (preferably sodium hydroxide), vinyl acetate and a water-soluble polymerization initiator which is a per-compound (preferably ammonium persulphate) by bringing these reactants together in an aqueous medium so as to form an aqueous solution of the desired saline copolymer without isolating any intermediate product. We have also found that under appropriate conditions, methyl methacrylate can be saponified by means of aqueous alkali metal hydroxide (preferably sodium hydroxide) and the salt formed can be copolymerized in the aqueous medium in which it is formed with vinyl acetate to form an aqueous solution of copolymer which can be used as the protective colloid, say in emulsion polymerization of vinyl acetate, without isolating the intermediate alkali metal monomeric methacrylate. One method of making such copolymer solutions directly comprises saponifying the methyl methacrylate while dissolved in a solution of alkali metal hydroxide in aqueous methanol, removing methanol and any residual methyl methacrylate, neutralizing the solution, adding the vinyl acetate and water-soluble polymerization initiator, effecting the desired copolymerization and removing any residual vinyl acetate by distillation. In an alternative method which does not involve distilling off more methanol than is liberated by the saponification the methyl methacrylate is added gradually to hot aqueous alkali-metal hydroxide at the rate at which saponification occurs. The methanol formed is then distilled off with any residual methyl methacrylate and neutralization, copolymerization and removal of any residual vinyl acetate are then carried out as before. To obtain effective copolymerization it appears to be essential to remove substantially all unreacted methanol and methyl methacrylate. It is also important for its use as protective colloid that the copolymer should be uncontaminated with residual monomeric methacrylic acid or salts thereof. Obviously, it is desirable that the copolymer should be substantially free from unreacted vinyl acetate. Vinyl acetate enters into the copolymerization more slowly than alkali metal methacrylate and is therefore employed in higher proportion in the monomer mixture than is required in the copolymer, the excess being removed after copolymerization of all the methacrylate. With regard to the amount of initiator used in the copolymerization we have found that, using ammonium persulphate, unless at least 0.5% based on the monomer weight is employed polymerization of the alkali-metal methacrylate does not go to completion so that the product contains unreacted methacrylate which is objectionable if the product is to be used subsequently as protective colloid in polymerization. We prefer to employ an amount of initiator equivalent to between 0.5 and 1.5%, based on the total monomer weight, of ammonium persulphate.

The following examples illustrate the preparation of a copolymer according to the invention.

Example 1

The charge employed was as follows:

100 parts of a 30% aqueous solution of sodium methacrylate of pH 6;
10 parts of vinyl acetate;
0.4 part of ammonium persulphate.

The mixture was heated to reflux and kept at this temperature (about 68° C.) for three hours. The product was precipitated in methanol and dried slowly. It was found to contain 3.2% of combined vinyl acetate.

Example 2

The charge was as follows, all the parts being by weight:

40 parts of methacrylic acid;
10 parts of viynl acetate;
200 parts of benzene;
0.5 part of benzoyl peroxide.

This charge was heated to 80° C. under reflux and maintained at that temperature for one hour. During this period the acid copolymer precipitated as formed. It was filtered off, washed and dried. It was found to contain 91.7% by weight of methacrylic acid.

This copolymer was converted to the desired saline copolymer by dispersion in aqueous caustic soda to give an approximately 40% aqueous solution of the saline copolymer.

Example 3

In this example and the next the copolymer solution suitable for use directly (at appropriate dilution) in polymerization vinyl acetate was made in a single stage from methacrylic acid, caustic soda and vinyl acetate in an aqueous medium containing a water-soluble polymerization initiator.

The charge was as follows:

59.5 parts of redistilled unstabilized methacrylic acid;
25.25 parts of caustic soda;
25.00 parts of vinyl acetate;
1.00 part of ammonium persulphate;
175.00 parts of water.

The ammonium persulphate was added last after raising the temperature of the rest of the charge to reflux temperature and setting the stirrer in operation. This charge was stirred under reflux for 3 hours. Excess vinyl acetate was then distilled off, leaving a clear viscous liquid of 33% solids content.

Example 4

The process was carried out as in Example 3 but using commercial methacrylic acid stabilized with 0.1% of pyrogallol. In subsequent use of the copolymer solution obtained, in polymerizing vinyl acetate a short induction period, presumably due to the pyrogallol, was observed.

Example 5

In this and the next example the sodium methacrylate was made by saponification of methyl methacrylate in an aqueous medium and was copolymerized without isolation, with vinyl acetate.

The initial charge was as follows:

120 parts of methyl methacrylate;
80 parts of methanol;
160 parts of water.

To the stirred charge at 55° C., 48 parts of solid caustic soda were added and the mixture was allowed to reflux for 30 minutes. Methanol and residual monomer (very little) were then distilled off, the reaction mixture was diluted with 100 parts of water and brought to pH 7 by the addition of phosphoric acid.

Vinyl acetate (40 parts) and ammonium persulphate (1.6 parts) were then added and reflux was maintained, with stirring, for two hours. A further 100 parts of water was then added and the residual vinyl acetate was distilled off as an azeotropic mixture with water (the mixture containing about 8% of water) boiling at about 65° C.

The copolymer in the resulting solution contained 9.0% of combined vinyl acetate.

Example 6

To a stirred solution of 48 parts of caustic soda in 160 parts of water, at 60 to 65° C., there was gradually added in the course of 90 minutes 120 parts of methyl methacrylate. The addition was made at substantially the rate at which saponification occurred so as to avoid the accumulation of methyl methacrylate in the reaction mixture. Reflux was maintained for 1 hour, after which methanol and residual monomer were distilled off. Dilution, neutralization, copolymerization with vinyl acetate and removal of residual vinyl acetate were then carried out as in Example 5.

The preferred features of the method of carrying out emulsion polymerization in an aqueous medium using the copolymer as protective colloid include: the use of water-soluble polymerization initiators, especially initiators which are water-soluble per-compounds such, for example, as ammonium persulphate, with or without activators, e.g. water-soluble, reducing, sulphur compounds, therefor; the addition of the initiator in two or more stages; the presence in the aqueous medium of a sequestering agent such as trisodium ethylene diamine tetra-acetic acid or other water-soluble salt of ethylene diamine tetra-acetic acid; the presence in that medium of a plasticizer for the polymer to be formed in the emulsion, e.g., in the case of polyvinyl acetate, a plasticizer such as dibutyl phthalate; the presence in the medium of sodium bicarbonate or other alkali metal salt of a strong acid in such concentration as to prevent the development of undue acidity during polymerization; and the addition of the greater part of the monomer, e.g. 70-90% or 95% thereof gradually during the course of polymerization, and especially the carrying out of the polymerization in apparatus provided with means to allow of refluxing the monomer, the monomer being added to substantially the rate at which it polymerizes. Preferably the weight ratio of vinyl acetate to water should at no stage exceed 15:85.

The following examples illustrate the use of the copolymers of the invention in making stable concentrated emulsions of polyvinyl acetate.

Example 7

A reaction mixture of the following composition, the parts being by weight, was charged into a stainless steel polymerizer provided with stirrer, heating and cooling means, and reflux condenser:

18.0 parts of the copolymer obtained in Example 1;
0.6 part of sodium bicarbonate;
0.2 part of the trisodium salt of ethylene diamine tetra acetate;
9.0 parts of dibutylphthalate;
400.0 parts of water.

The temperature was raised to 50° C. and 1.1 parts of ammonium persulphate was added. This point marks the start of the process, to which all subsequent times are referred.

At 5 minutes 48 parts of vinyl acetate were added and the temperature was raised slowly to 75° C.

At 80 minutes a slow feed of vinyl acetate (432 parts) was started whilst raising the temperature to 80-82° C.

At 200 minutes 0.30 part of ammonium persulphate was added.

At 285 minutes the slow feed of vinyl acetate was finished, the temperature was raised to 90° C. and 0.15 part of ammonium persulphate was added.

At 315 minutes 0.02 part of sodium bicarbonate was added and the emulsion was cooled to 30° C. and discharged.

The monomer content of the emulsion was found to be 0.49%. Its viscosity as measured by a No. 4 Ford cup at 25° C. was 76 seconds. Its pH was 5.2. The emulsion was of good stability.

Example 8

The process was carried out as in Example 7 but using a copolymer prepared according to Example 3. The emulsion obtained was of slightly larger average particle size than that of Example 7.

Example 9

The process was carried out as in Example 7 except that the protective colloid used was obtained by the process of Example 5 and was introduced in the form of the aqueous solution obtained by the process of that example in amount sufficient to provide 18 parts by weight of the solid protective colloid, the amount of water specified in Example 7 being reduced by the amount added with the protective colloid.

An emulsion of good stability and small particle size was obtained containing 0.78% of residual monomer, and of pH 5.5. The size of the particles was difficult to estimate owing to Brownian movement. No stationary particles were observed and the size of those in motion was judged to be less than 1 micron.

*Example 10*

The process was carried out as in Example 9 except that the solution of protective colloid was obtained by the process of Example 6. A vinyl acetate emulsion of small particle size and good stability containing 0.56% of residual monomer was obtained. The viscosity at 20° C. measured by a No. 4 Ford cup was 115 seconds. The remarks on particle size in the preceding example apply.

Aqueous emulsions of copolymers of vinyl acetate with a minor proportion of dibutyl maleate or dibutyl fumarate can be prepared by the methods of Examples 7 to 10, omitting the plasticizer (dibutyl phthalate) which is unnecessary since these copolymers are internally plasticized, and replacing part (e.g. 20 to 30%) of the vinyl acetate fed by the same weight of co-monomer.

In a similar way also aqueous emulsions of polyvinyl propionate can be made.

Instead of ammonium persulphate, other water-soluble polymerization initiators, especially water-soluble percompounds such as potassium persulphate and hydrogen peroxide, can be used.

The preferred plasticizer is dibutyl phthalate but other plasticizers for polyvinyl acetate, e.g. triethylene glycol di-2-ethyl butyrate, can be used. When emulsions are required containing more than a few percent (based on the polymer weight) of plasticizer these may be made by polymerizing in the presence of a small proportion of plasticizer (1 to 5% of the polymer weight) and dispersing further quantities of plasticizer in the emlsion so formed. In this way we have obtained emulsions of good stability containing as much as 25%, based on the polymer weight, of plasticizer. The presence of large proportions of plasticizer during polymerization is to be avoided as likely to slow down or even inhibit polymerization when water-soluble initiators are used.

Though the keeping qualities of the emulsions of Examples 7 to 10 were found to be good in glass vessels, in unlacquered tinned steel drums they were found to produce some corrosion accompanied by incipient precipitation. By increasing the pH of the emulsions from about 5 to 7 the keeping properties in such unlacquered vessels were much improved.

Agents of the kind variously known as "surface tension depressants," "wetting agents," "detergents" and "surface active agents" (see, for instance, Industrial and Engineering Chemistry, volume 33, pp. 16 to 22) may be present also in the aqueous medium but it is a remarkable feature of the method of the invention that concentrated dispersions of small particle size and relatively high stability can be obtained without the use of such agents. Thus by the methods of Examples 7 to 10 we have obtained emulsions in which substantially all the particles were of size less than 1 micron. Emulsions in which 95 to 100% of the particles are of this size can readily be obtained. Occasionally some larger particles are obtained which it is desirable to filter off.

The utilization of the copolymers of the invention has been described with particular reference to the emulsion polymerization of vinyl acetate. These copolymers, however, which are believed to be broadly novel, are useful for many other purposes. They can be used as protective colloids in the emulsion polymerization (including copolymerization) of other unsaturated compounds capable of free-radical initiated polymerization in aqueous emulsion to yield high polymers, especially other vinyl esters, acrylic and α-lower alkyl-substituted esters of acrylic acid, vinyl chloride, vinylidene chloride, acrylonitrile, methacrylonitrile, styrene, butadiene and other polymerizable dienes. They may also be used in dispersing preformed polymers and other colloids. The copolymers are particularly useful as protective colloids in concentrated emulsions, i.e. emulsions containing 40 to 60% of polyvinyl acetate or other polymers. They are useful components of textile sizes, especially for warp yarns, printing pastes, and adhesives.

Having described our invention, what we desire to secure by Letters Patent is:

1. A process for the production of a stable aqueous emulsion of a polymeric compound which comprises polymerizing at least one monomer capable of free-radical polymerization and containing at least one aliphatic carbon-to-carbon unsaturation in an aqueous emulsion containing a water-soluble polymerization catalyst and also a protective colloid as an emulsion stabilizer wherein the protective colloid used is a water-soluble copolymer of from 99.5 to 90 percent by weight of a water-soluble salt of methacrylic acid and from 0.5 to 10 percent by weight of vinyl acetate and the said protective colloid is the sole dispersing agent present.

2. A process for the production of a stable aqueous emulsion of polyvinyl acetate which comprises polymerizing vinyl acetate in an aqueous emulsion containing a water-soluble polymerization catalyst and also a protective colloid as an emulsion stabilizer wherein the protective colloid used is a water-soluble copolymer of from 99.5 to 90 percent by weight of a water-soluble salt of methacrylic acid and from 0.5 to 10 percent by weight of vinyl acetate and the said protective colloid is the sole dispersing agent present.

3. A process as claimed in claim 2 wherein the said water-soluble salt of methacrylic acid is the sodium salt.

4. A process for the production of a stable aqueous emulsion of a copolymer of vinyl acetate which comprises copolymerizing said vinyl acetate with at least one other monomer capable of free-radical polymerization and containing at least one aliphatic carbon-to-carbon unsaturation in an aqueous emulsion containing a water-soluble polymerization catalyst and also a protective colloid as an emulsion stabilizer wherein the protective colloid used is a water-soluble copolymer of from 99.5 ato 90 percent by weight of a water-soluble salt of methacrylic acid and from 0.5 to 10 percent by weight of vinyl acetate and the said protective colloid is the sole dispersing agent present.

5. A process as claimed in claim 4 wherein the said water-soluble salt of methacrylic acid is the sodium salt.

References Cited in the file of this patent

UNITED STATES PATENTS

| | | |
|---|---|---|
| 1,976,679 | Fikentscher | Oct. 9, 1934 |
| 2,133,257 | Strain | Oct. 11, 1938 |
| 2,244,703 | Hubbuch | June 10, 1941 |
| 2,317,725 | Billig | Apr. 27, 1943 |
| 2,444,396 | Collins | June 29, 1948 |
| 2,548,318 | Norris | Apr. 10, 1951 |

FOREIGN PATENTS

| | | |
|---|---|---|
| 743,860 | Germany | Jan. 4, 1944 |